Feb. 20, 1934.   J. W. JOHANSSON   1,948,381
MACHINE FOR THE MANUFACTURE OF MATCH SPLINT STRIPS
Filed June 4, 1932   4 Sheets-Sheet 1
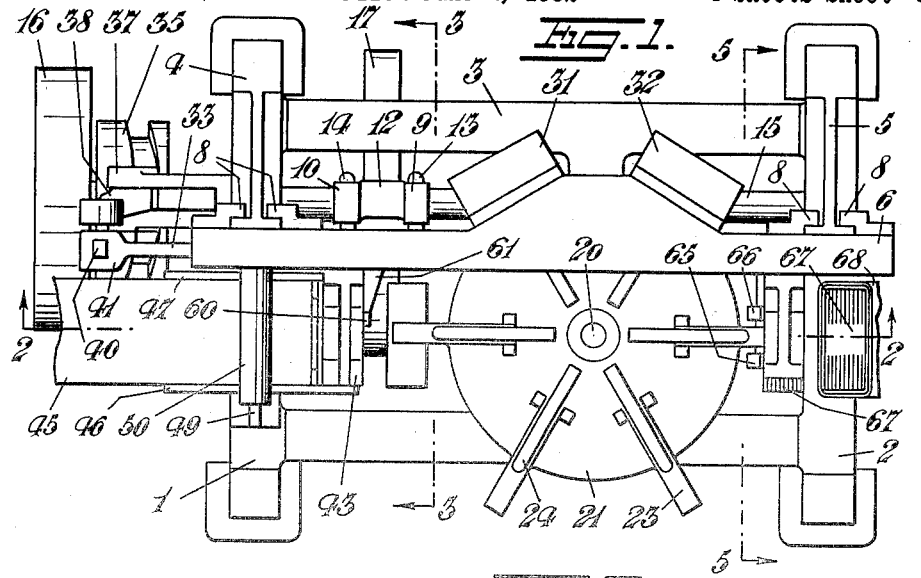
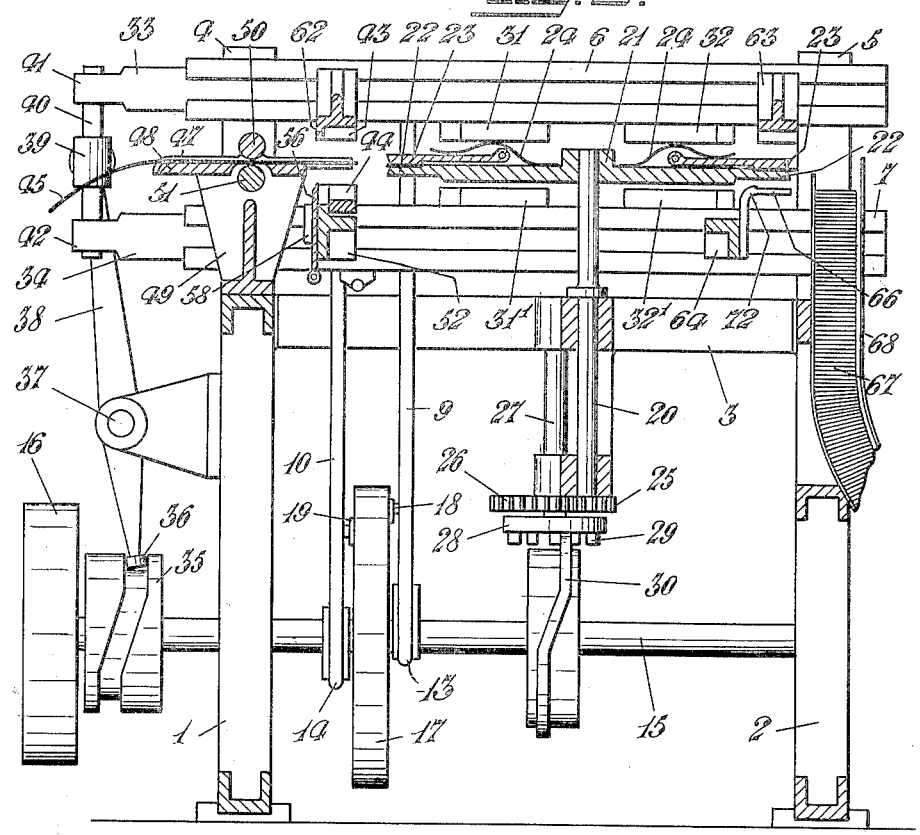
Inventor
Johan W. Johansson
By Sommers & Young
Attys.

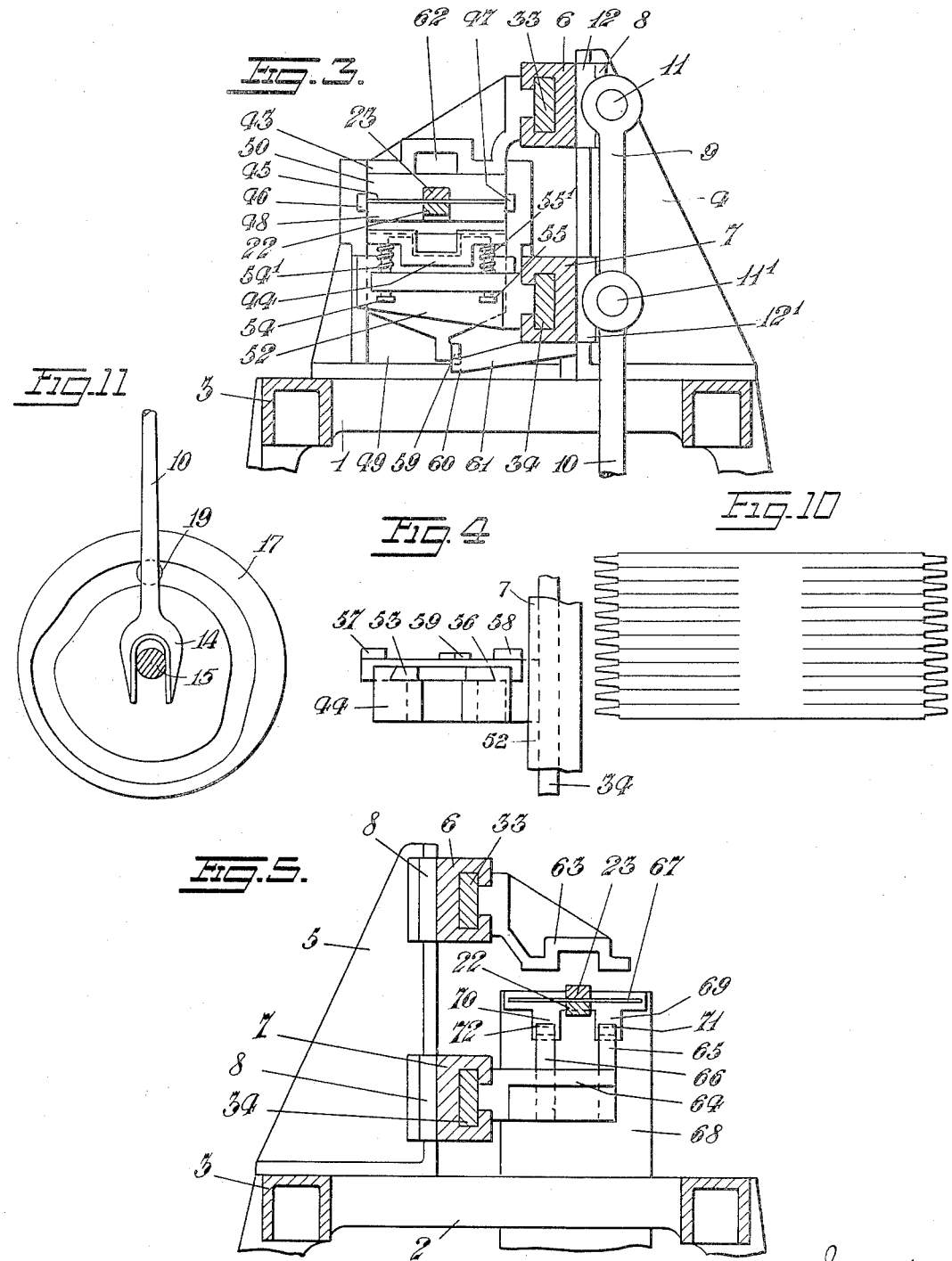

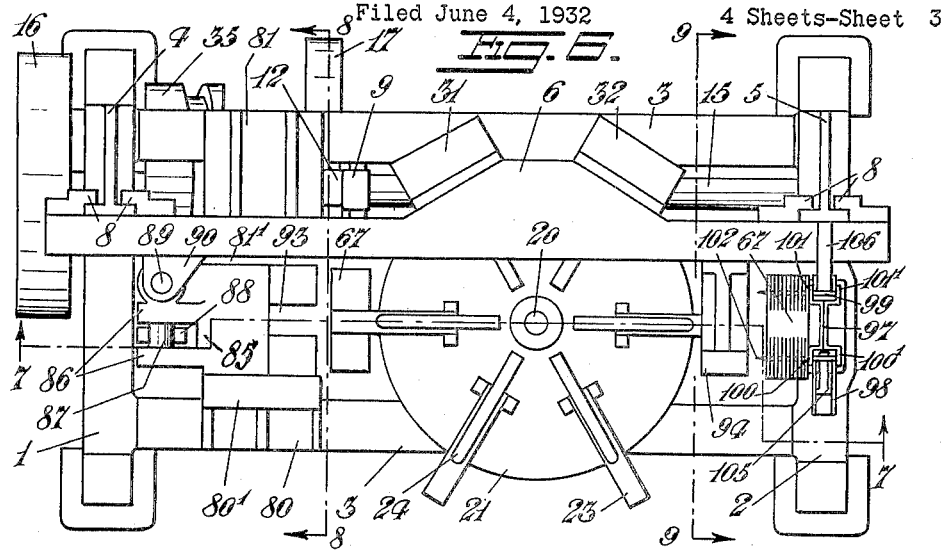
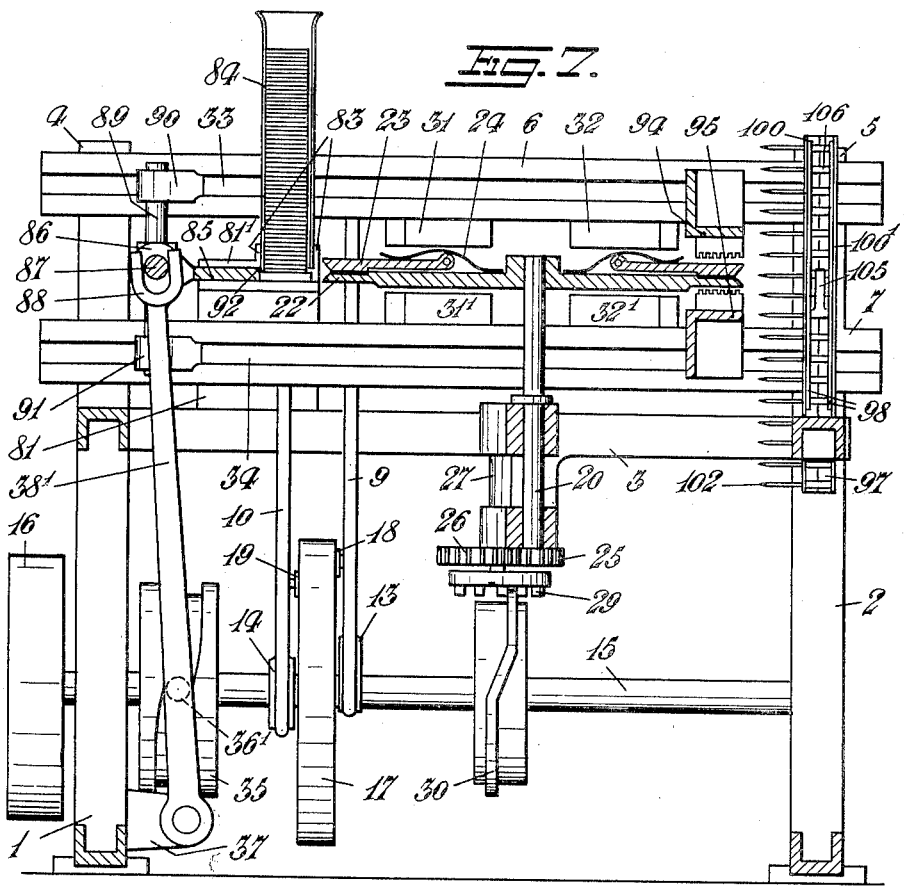

Feb. 20, 1934.  J. W. JOHANSSON  1,948,381
MACHINE FOR THE MANUFACTURE OF MATCH SPLINT STRIPS
Filed June 4, 1932  4 Sheets-Sheet 4
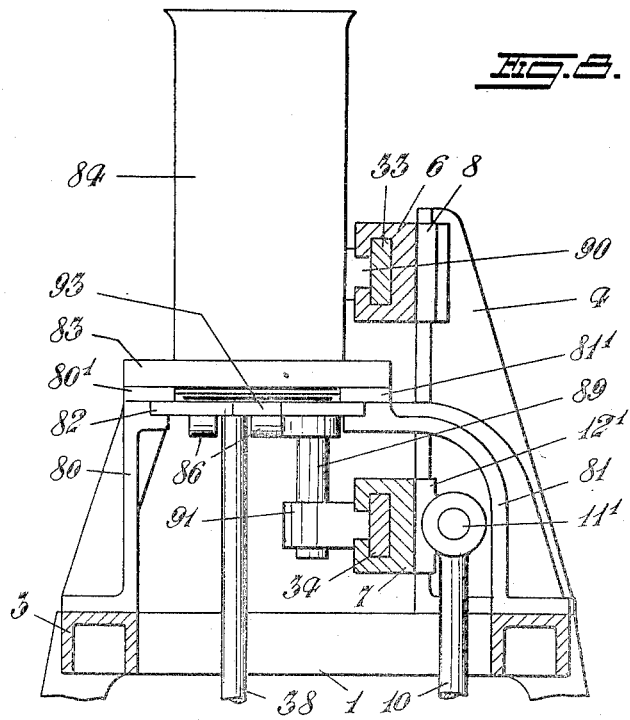
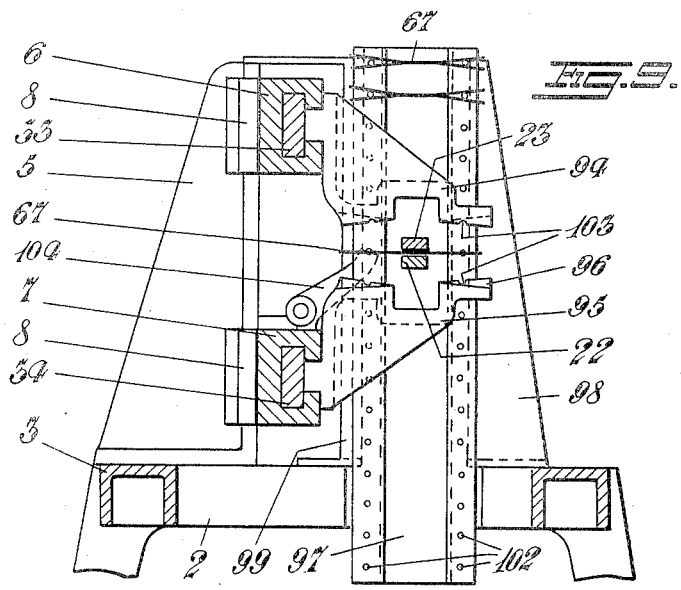
Inventor
Johan W. Johansson
By Sommers & Young
Attys.

Patented Feb. 20, 1934

1,948,381

UNITED STATES PATENT OFFICE 1,948,381

MACHINE FOR THE MANUFACTURE OF MATCH SPLINT STRIPS

Johan Werner Johansson, Bankeryd, Sweden

Application June 4, 1932, Serial No. 615,390, and in Sweden June 5, 1931

6 Claims. (Cl. 144—51)

This invention relates to machines for the manufacture of splint strips to be used in the manufacture of match strips which comprise a set of splints connected at their one end with a common base and adapted, after heads have been put on the same, to be attached to a cover in order to form so called match books. In the manufacture of splint strips of the above said kind according to one well-known method, a strip of material, as cardboard, is passed below continuously driven rollers, which operate to cut the individual splints out from the strip, form pointed ends thereon, weaken the splints at their base portion, print advertisement on the splints, bend alternate splints to opposite sides, and perform similar operations. In machines of the said kind, however, it has proved difficult to obtain a satisfactory cutting operation owing to the fact that the splint or the material cut away has been jammed between the radially extending knives of the rollers, because the distance between said knives is reduced towards the centre of the roller. As, furthermore, the splints should be weakened at their base and pointed at their free ends, the cutting tools will be rather complicated, rendering the exchange of a damaged knife difficult. When the various operations are performed in a plurality of different places, then the work pieces cannot be adjusted to exact positions with relation to the tools. Even in the conveyance of a continuous strip of material below a series of reciprocating cutting and settling tools the long strips, weakened as they are due to the cutting operation will be difficult to manipulate during the further operation. For the manufacture of splint strips made from wood the machines above mentioned cannot be used with advantage, because long strips of veneering are in several places impaired by knotholes and other defects, and the defective portions cannot be removed in advance.

The object of the invention is to overcome the above said difficulties by the provision of a machine for the manufacture of splint strips both from cardboard and from wood. The characteristic feature of said machine involves a movable supporting means to receive splint strip pieces cut to appropriate lengths and which is adapted to move said pieces into two or more given positions in order to subject them to different operations. The splint strip pieces may be either of single or double width, depending upon whether the cutting of the splints takes place along one side of the strip or along both sides.

In the accompanying drawings, two embodiments of a machine according to this invention are shown by way of example. Fig. 1 is a plan view of one embodiment. Fig. 2 is a vertical section on the line 2—2 in Fig. 1. Fig. 3 is a section on the line 3—3 in Fig. 1, showing a device for introducing the splint strip pieces into the movable carriers. Fig. 4 is a plan view of the lower part of said device. Fig. 5 is a section on the line 5—5 in Fig. 1, showing a device for removing the finished splint strips from the movable carriers. Fig. 6 is a plan view of the second embodiment. Fig. 7 is a vertical section on the line 7—7 in Fig. 6. Fig. 8 is a section on the line 8—8 in Fig. 6, showing a device for introducing the splint strip pieces into the carriers. Fig. 9 is a section on the line 9—9 in Fig. 6, showing a device for removing the finished splint strips from the carriers. Fig. 10 is a plan view of a completed blank showing the result of the cutting operation. Fig. 11 is a side view of an operating cam and cam follower and guide mechanism.

In both of the embodiments shown the various elements of the machine are mounted on a support comprising two lateral bearers 1, 2 and a connecting frame 3 shaped as an H when seen from above. Each lateral bearer carries a bracket 4 and 5, respectively, serving as guides for two vertically movable beams, viz, one upper beam 6 and one lower beam 7. Said beams are held to the brackets by means of guides 8 and may be brought together and retracted from each other by means of two pairs of lifting rods, 9, 10, one pair of which only is shown in the drawings for the sake of clearness. Said lifting rods are hinged at their top by means of a pin and bearing joint 11, 11' to the respective beams, whereas the forked bottom ends 13, 14 of the rods embrace a driving shaft 15 mounted in the support so as to be guided thereby. Driving power is transmitted to said driving shaft over a belt pulley 16. Between the forked ends 13, 14 the shaft 15 carries a cam slot disc 17 having a cam slot on each side. Engaging said cam slots are rollers 18 and 19, respectively, carried by the lifting rods, whereby the rotation of the cam slot disc will cause the beams 6, 7 to move up and down in conformity with the shape of the slots.

Mounted in the frame 3 is a vertical shaft 20 carrying at its top a circular disc 21 to support the splint strip pieces or blanks. Said disc 21 is provided with six carriers or grippers for the splint strip pieces arranged radially at equal angular distance. Each carrier or gripper comprises a lower plate 22 secured to the disc 21 or formed integrally therewith, and an upper plate 23. Said last mentioned plate is hingedly connected to the disc 21 and is yieldingly pressed against the respective lower plate 22 by a spring 24 attached to the disc 21. At its bottom end the shaft 20 carries a toothed wheel 25 meshing in a toothed wheel 26 twice as large as the wheel 25, said wheel 26 being mounted upon a vertical shaft 27 mounted in the frame 3. Said shaft 27 carries below the toothed wheel 26 a disc 28 carrying on its lower surface twelve rollers 29 mounted so as to form a circle and each carried by a pin perpendicular to the disc 28. Engaging in between two such rollers is a cam disc 30 carried by the shaft 15, which is of such a shape as to hold the disc 29 against rotation during a portion of each revolution of the cam disc but allows it to rotate a twelfth of a revolution during the remainder of the revolution of the cam disc, thereby allowing the cam disc to engage the space between two rollers 29 next following. By means of the toothed gearing 25, 26 the shaft 20 and thus also the disc 21 will be rotated a sixth of a revolution for each complete revolution of the cam disc 30 and the shaft 15.

The beams 6 and 7 of which one is situated above and the other below the disc 21 carry the tools required in finishing the splint strips, viz. one upper and one lower cutting tool 31 and 31', respectively, to cut the ends of the splints, and one upper and one lower cutting tool 32 and 32', respectively, to cut the lateral edges of the splint. Said pairs of cutting tools are positioned at the same angular distance as the grippers 22, 23, that is to say, at a distance of 60°. The introduction of the splint strip pieces into the carriers or grippers is effected in a first operative position, the cutting operation is effected in second and third positions, and the removal in a fourth position. The introduction and removal takes place in radial direction, thereby allowing one and the same reciprocating movement to be utilized for those means which are required to effect the introduction of the splint strip pieces or blanks into the carriers or grippers and the removal of the finished splint strips therefrom. In the embodiment shown in Figs. 1–5 both of said means are mounted on the beams 6 and 7 which to this end are shaped as guides for rods 33, 34 to which said tools are attached and which are movable in the longitudinal direction of the beams. To said rods a reciprocating motion independent of the level of the beams is simultaneously imparted from the driving shaft 15 of the machine, said driving shaft carrying to this end a cam drum 35 the cam slot of which is engaged by a roller 36. Said roller is carried at the bottom end of a two-armed lever 38 mounted in a bracket 37 and having its other end hingedly connected to a crosshead 39. Said crosshead carries a vertical rod 40 of square cross section the ends of which are guided in guide-ways 41, 42 provided at the ends of the rods 33, 34 projecting beyond the beams 6, 7. Upon the rotation of the cam drum 35 the lever 38, the crosshead 39 and the rod 40 will, consequently, have an oscillating motion and the rods 33, 34 a corresponding reciprocating linear motion imparted thereto. The introducing and removing means carried by the rods 33, 34 will thus perform both a horizontal and a vertical reciprocating movement for each revolution of the driving shaft 15.

In the machine shown in Figs. 1–5 the splint strip material is supplied in the form of a continuous band from which the individual splint strip pieces or blanks are cut after the band has been introduced into the carriers or grippers 23. The device for conveying the band is in this case the same as the device for introducing the splint strip pieces into the carriers. Said device comprises one upper and one lower pressure plate 43 and 44, respectively, said plates upon the movement of the beams towards each other jamming the band of material 45 between themselves and carrying it with themselves in their subsequent movement towards the supporting member. The band of material which may be supplied from a reel, not shown, rests with its fore end on a table 48 provided with lateral guide-ways 46, 47 which is supported by a frame 49 mounted on the lateral bearer 1. Mounted in said frame above and below the table 48, respectively, are two rollers 50, 51 between which the band of material is conveyed and held against rotation after each conveying movement. The foremost end of the band of material, however, is not supported by the table, which is not sufficiently extended to support said end, but is only guided by the lateral guideways 46—47, thereby allowing the pressure plates to be moved freely into contact with the band from opposite sides thereof. The upper pressure plate 43 is directly attached to the rod 33 slidably mounted in the upper beam, while the lower pressure plate 44 is yieldingly supported by a bracket 52 attached to the rod 34 slidably mounted in the lower beam 7. The pressure plate 44 may slide vertically relatively to the bracket 52 and is guided by the latter, inasmuch as a vertical wall 53 (Fig. 4) upstanding from the bracket engages a dovetail groove formed in the pressure plate 44. Secured to the pressure plate 44 are, furthermore, two bolts 54, 55 guided in corresponding borings in the bracket. Said bolts serve to guide an individual one of two pressure springs 54' and 55' inserted between the pressure plate and the bracket in order to resiliently hold the band of material 45 between the plates 43 and 44, when the latter are brought together.

The pressure plates are formed with central recesses so as to form a space between themselves into which the gripping plates 22, 23 may freely enter in the movement of the pressure plates towards the disc 21. Also the upstanding wall 53 is formed with such a central recess in order not to interfere with the movement of the pressure plates into position on level with the grippers 22, 23.

Mounted in the bracket 52 and the wall 53 upstanding therefrom is a vertically movable severing knife 56. The cutting edge of said knife is normally situated somewhat below the upper surface of the pressure plate 44. To guide the knife two ribs 57, 58 are provided which are rigidly attached to the bracket 52. At its bottom end the knife carries a roller 59 adapted in the reciprocating movement of the bracket 52 to be operated by an abutment 60 provided at the outer end of an arm 61 secured to the lower surface of the beam 7. The recess formed in the upper pressure plate 43 does not extend through the entire plate but is limited towards the feeding rollers by a wall 62 adapted to cooperate with the severing knife in the upward stroke thereof.

In order to remove the finished cards one upper and one lower removing element are provided which are secured to the slidable rods 33, 34 of the upper and lower beam, respectively. The upper removing element comprises a pressure plate 63 formed with a central through-extending recess to allow the upper gripping plate 23 to pass. The lower gripping element comprises a bracket 64 rigidly connected to the rod 34 which carries two plates 65, 66 situated on opposite sides of the grippers 22, 23. Said plates 65, 66 are formed with stop projections extending beyond the level of the plates.

Just opposite the discharging position a receptacle 68 is provided to receive the finished splint strips. The upper mouth of said receptacle is situated slightly below the level of the splint strips carried by the disc 21 and is formed with recesses 69, 70 in its surface facing said disc to allow the plates 65, 66 to freely pass to a discharging position above the receptacle. The upper portion of the receptacle is vertical, whereas the lower portion of the receptacle is bent to horizontal or inclined position.

The operation of the machine is as follows:

When the pressure plates 43, 44 are in the position shown in the drawings, that is to say, at their greatest distance from the disc 21, while the beams 6 and 7 are in their uppermost and lowermost position, respectively, then the band of material 45 from a preceding cycle of operations is situated with its fore edge in register with the fore end of the pressure plates as reckoned in the feeding direction. The driving mechanism of the beams 6, 7 and the rods 33, 34 slidably mounted therein are so arranged as first to move the beams towards each other without causing any displacement of the rods in their longitudinal direction. As a result, the pressure plates 43, 44 will be brought into contact with the lateral portions of the band of material 45, so as to jam the band between the plates under the action of a given power depending on the strength of the springs 54' and 55'. Upon the displacement of the rods 33, 34 to the right in Figs. 1 and 2 then following the pressure plates will first bring the band of material 45 with themselves in their movement towards an empty gripper 22, 23 which during a preceding stage of operation has been brought to the introducing position. After the pressure plates have advanced a distance corresponding to the width of the splint strips, the roller 59 strikes the abutment 60 of the arm 61 so as to lift the severing knife 56, causing it to sever a blank due to its cooperation with the wall 62 of the pressure plate 43. The rollers 50, 51 will then maintain the band of material in its position while the splint strip blank severed will be removed by the pressure plates 43, 44. Already prior to the starting of the severing knife, however, the plates 43, 44, together with the band of material were moved to such an extent relatively to the gripper 22, 23 as to allow said gripper to engage the central space between the plates, thereby introducing the fore end of the band of material between the upper and lower gripping plates. Upon the continued movement of the introducing elements the splint strip blank severed will be completely introduced into the gripper.

The beams are then moved from each other, thereby releasing the introducing means from their engagement with the splint strip blank and the rods 33, 34 are restored to their normal or extreme left hand position, the disc 21 rotating at the same time a sixth of a revolution. As a result, the splint strip blank will be brought to a new operative position between the cutting tools 31 and $31^1$. In the succeeding movement of the beams towards each other the cutting tools will be brought into engagement with the blank to form the ends of the splint. While the beams and the tools carried thereby are close to each other a new splint strip blank is introduced into the gripper which is now in the introducing position. The beams are then again moved from each other, again followed by a rotation of the disc 21 a sixth of a revolution causing a displacement of the splint strip blank from the operative position between the cutting tools 31, $31^1$ to the operative position between the cutting tools 32, $32^1$. Due to the bringing together of the said last mentioned tools the lateral edges of the splint are cut, the beams being then again brought apart and the finished splint strip passed to the discharging position by a further rotation of the disc 21 a sixth of a revolution. The rotation of the disc being completed, the discharging elements, viz. the plates 63 and 65—66 are in the position shown in the drawings, that is to say, above and below the splint strip, respectively. In the subsequent bringing together of the beams the plate 63 as well as the plates 65, 66 are brought into engagement with those portions of the splint strip which project beyond the gripper 22, 23. In the movement of the rods 33, 34 to the right then following, with the resulting feeding of the band of material in the already described way and introduction of a severed splint strip blank into one of the grippers, the abutments 71, 72 will engage the edge of the splint strip 67 whereby the splint strip is caused to partake in the movement of the plates and is, as a result, pushed out of the gripper. The plates are now moved to a position right in front of the receptacle 68 and are then brought apart due to the vertical movement of the beams. In this movement the plates 65, 66 move freely in the recesses 69, 70 in the wall of the receptacle, and are lowered to a certain extent therein together with the splint strip resting on the plates. The plates when thus lowered press with their lower surface on the splint strips previously collected in the receptacle so as to force said previously collected splint strips down in the receptacle to provide sufficient space to receive the new splint strip. In the movement of the rod 34 as well as of the bracket 64 and the plates 65, 66 to the left then following, the splint strip is prevented from moving with the plates by those portions of the wall of the receptacle which remain on both sides of the recesses 69, 70, and are consequently retained in the receptacle while resting on the splint strips previously collected therein. The receptacle is emptied now and then at its horizontal or substantially horizontal bottom end.

The embodiment shown in Figs. 6–9 differentiates from that above described, as far as the means for introducing the splint strip blanks into the grippers and removing the splint strips from the grippers and collecting them are concerned. The splint strip blanks are applied in this case not as a continuous band of material from which the individual blanks are severed and introduced into the grippers, but are previously cut to the desired size and collected in a hopper 84 from which they are supplied to the grippers by means of a plunger 85. The means for discharging the splint strips from the grippers comprises also in this case two reciprocating plates, but here a further operation is added, viz. setting of the finished splint strips by bending alternate splint to opposite sides. Said setting operation is effected by the same plates used for effecting the discharging operation and is carried out at the same time that the splint strips are released from the grippers. In order that the splint strips may maintain their set position they are not collected in a receptacle as in the embodiment above described, but are placed upon separate conveying bars. Said placing operation is, likewise, effected by the above said plates. The beams do not carry both the introducing and the discharging elements but only the latter, yet the driving mechanism is common for both types of elements.

The supporting frame as well as the beams and the supporting disc together with the associated driving mechanisms are arranged in the same way as in the embodiments already described. The horizontal movement of the introducing and discharging elements is derived from a cam slot drum 35 keyed to the driving shaft 15. Engaging the cam slot of said drum is a roller $36^1$ mounted on a lever $38^1$ which is in turn mounted on a bracket $37^1$, the oscillating movement of which is transformed to a reciprocating rectilinear movement of the rods 33, 34 and the supplying plunger 85. Said plunger is slidably mounted between two brackets 80, 81 carried by the frame 3 and guiding ribs $80^1$ and $81^1$, respectively, provided on said brackets. By means of a pair of transversely extending rods 83, 83 also the hopper 84 is carried by said brackets 80 and 81. The hopper 84 and the rods 83 are not shown in Fig. 6 for the sake of clearness. The plunger 85 is provided with lugs 86, 86 to carry a journal pin 87 which is embraced by the forked end 88 of the lever $38^1$. Secured to the rear portion of said plunger is, furthermore, a vertical rod 89 which extends through bearings 90 and 91 rigidly connected to the rods 33 and 34, respectively. Due to this connection the rods 33, 34 are caused to perform the same reciprocating movement as the plunger 85 irrespective of the level of the beams.

The content of the hopper 84 rests on the plunger 85 which is formed with a shoulder 92 which in the forward motion of the plunger takes the lowermost splint strip blank with it so as thereby to remove it from the hopper. In its end facing the disc 21 the plunger is formed with a central recess 93 in order to allow the plunger to freely move to a position on level with the grippers 22, 23 which is for the time being in the introducing position.

The means for discharging the finished splint strips from the grippers comprises two plates 94 and 95 rigidly connected to the rods 33, 34, respectively, which are constructed substantially in the same way as the plate 63 of the embodiment already described. The edges of said plates 94, 95 facing each other, however, are provided with rows of teeth 96, as will clearly appear from Fig. 9, which mesh in each other when the plates are brought together. When the plates are brought together so as to embrace a splint strip 67, Fig. 9, which is situated in the discharging position the splints of this strip will, consequently, be bent alternately upwards and downwards under the action of said teeth 96. This operation is termed "setting" in this specification. Due to the engagement of the teeth in the splint strip the latter will be carried by the plates 94, 95, as the latter move to the right on the drawings and are, as a result, withdrawn from the gripper, while maintaining their setting. The plates 94, 95 are adapted, when displaced after having been brought together, to place the splint strip on a conveying element in such a way as to still retain the setting of the splints. Said conveying element comprises in the embodiment shown a vertically movable bar 97 which is guided in two guideways 98, 99 situated on opposite sides of the bar which are carried by the lateral bearer 2, said guide-ways being arranged to enter between lateral flanges 100, $100^1$ and 101, $101^1$, respectively, of the bar. Projecting from the bar 97 are two rows of pairs of needles 102 on which the splint strips may be placed in such a way as to cause the needles to engage the space between the two rows of oppositely bent matches of the match strips. To this end the teeth of the plates 94, 95 are formed with recesses 103 in register with each other which, when the plates are brought together, form channels in which the needles may freely enter in the movement of the plates away from the bar. Each time a splint strip has been placed over a pair of needles 102 the bar should, evidently, be displaced in its longitudinal direction such a distance as to bring another pair of needles in register with the gripper 22, 23. To this end a feeding pawl 104 is mounted on the lower beam 7 which is adapted to engage that portion 106 of the needles which is situated between the lateral flanges $100^1$ and $101^1$ of the bar 97. In order to maintain the bar in a fixed position an arresting pawl 105, Figs. 6 and 7, is mounted on the guide-way 98, said last mentioned pawl being adapted to engage the opposite row of needles 102 in the same way as already set forth in connection with the feeding pawl 104.

The operation of the machine, as far as it differentiates from that of the machine already described, is as follows:

With the supplying plunger 85 in retracted position, as shown in Figs. 6 and 7, the column of splint strip blanks contained in the hopper 84 rests exclusively on the fore portion of the plunger. In the movement of the plunger to the right or towards a gripper 22, 23 which is situated in the introducing position, the lowermost splint strip blank of said column will be caught by the shoulder 92 and carried thereby, whereas the remaining splint strip blanks are retained within the hopper. In the continued movement of the plunger said removed splint strip blank will be introduced between the resilient gripping plates 22, 23, and said movement of the plunger will not be interfered with by the gripping plates 22, 23 due to the provision of the recess 93. While leaving the splint strip blank in the gripper the plunger will then return to its normal position, as the next splint strip blank is in the introducing position in front of the shoulder 92. The plunger having been retracted to such an extent that the gripper is entirely out of engagement with the recess 93, the disc 21 will be rotated a sixth of a revolution, thereby passing the splint strip blank to the first cutting position between the cutting tools 31, $31^1$, and bringing an empty receptacle to the introducing position in front of the plunger 85.

The finished splint strip having again been moved two sixths of a revolution and operated in the cutting position between the cutting tools 32, 32¹, it is in the position diametrically opposite the introducing position where it is to be set and transmitted from the gripper to the conveying bar 97. In the position of the plates 94, 95 close to the disc 21 the teeth of said plates are in register with the corresponding matches of the strip. It is thus seen that when, due to the lowering and raising of the receptacle beams, the plates are brought together and their teeth mesh in each other, the teeth of each plate will force the matches into the space between the teeth of the other plate, thereby bending adjacent matches to opposite sides. The plates are then displaced horizontally in the direction away from the gripper towards the conveying bar 97 and, due to their engagement with the splint strip, they will carry said splint strip with themselves so as to withdraw it from the gripper, while maintaining the setting of the matches. The conveying bar 97 is now on such a level that one of the pairs of needles of the bar is in register with the splint strip. In the movement of the plates in the direction towards the bar said needles will, as a result, engage the channels formed by the recesses 103 so that the rows of oppositely bent splints will be on opposite sides of the needles. At the end of the movement of the plates the splint strip is entirely placed on said pair of needles. This operation being completed, the plates will be brought apart to such an extent as to bring their teeth out of engagement with the splint strip, the setting of which will yet be maintained by means of the needles. The plates are then restored in horizontal direction till they come out of the path on the needles of the bar, and are then brought apart to a still higher degree so as to allow the disc 21 to be rotated freely. During the transmission of the splint strip to the conveying bar the latter will be maintained in its position by the arresting pawl 105 which engages below the portion 106 of one of the needles 102 situated between the lateral flanges 100, 100¹ of the bar. When the plates are moved apart due to raising of the beam 6 and lowering of the beam 7 the feeding pawl 104 carried by said last mentioned beam will engage below the portion 106 of a needle situated on the opposite side of the bar. When the beams are then brought together with resulting raising of the beam 7 the bar 97 will thus be moved through the intermedium of the feeding pawl, whereupon the bar will be retained in its new position by the arresting pawl 105. In this way the conveying bar will be fed step by step according as new splint strips are placed thereupon. After the bar has been filled with splint strips it is removed from the guide-ways 98, 99, and then a new empty conveying bar may be inserted into the guide ways.

In the embodiment described the feed motion of the conveying bar is thus derived from the up and down movement of the beams. It is evident, however, that said movement may also be obtained from the driving shaft 15 by means of a separate transmission gear. Instead of separate conveying bars which are replaced according as they are filled, a plurality of conveying bars may be used which are connected to form a chain leading to the various devices provided for impregnating, paraffining, dipping, and drying the splint strip.

Both of the embodiments shown are provided with one gripping disc only with the associated introducing and discharging means as well as with cutting means. It is to be noted, however, that the machine may also be double acting, that is to say, provided with two gripping discs with the associated means, and further provided with an intermediate common receptacle or conveying device to which the splint strips are transmitted alternatively from both halves of the machine. Yet it is not deemed necessary to illustrate such a machine, because it will, evidently, be substantially symmetrical with relation to a vertical plane at right angles to the longitudinal direction of the machine through the receptacle 68 or the conveying bar 97.

In the embodiment shown in Figs. 1–5 the splint strip material is supplied in the form of a band and the finished splint strips are collected in a receptacle, while in the embodiment shown in Figs. 6–9, splint strip blanks previously cut to the desired size are introduced by means of a plunger into the grippers from a hopper and the finished splint strips are set and placed upon a conveying bar. It is evident, however, that the invention also involves machines in which the splint strip material is supplied in the form of a band and the finished splint strips are set and placed upon a conveying device, as well as machines in which splint strip blanks previously cut to the desired size are supplied from a hopper and the finished splint strips are not subjected to any setting operation, but are only transmitted to another receptacle to be collected therein. It is evident that the setting of the splint strips must not necessarily be effected by the discharging elements, while the splint strips are in the discharging position. The setting operation may also be effected in a separate operative position between the last cutting position and the discharging position. The number of operative positions as well as the number of operations are not limited to those referred to by way of example, and the introducing and discharging elements may also be arranged in a different relation to each other than in two positions on diametrically opposite sides of the disc 21. Instead of cutting the splint strip blanks along two opposite sides the cutting operation may equally well be effected along one side only. In both cases the splint strip blanks may be of a length at right angle to the splints which corresponds to a plurality of finished match strips in which case the severing of the blanks to such lengths may, preferably, take place after the dipping and drying operations have been completed.

What I claim is:—

1. A machine for making splint strips adapted for use in the manufacture of match strips, which comprise splints connected at one end to a common base strip, having in combination a hopper to receive splint strip blanks to be worked into splint strips, a movable conveyor to receive the finished splint strips, a reciprocating feeder to discharge the blanks from said hopper, means to carry the discharged blanks to successive working positions to subject them to subsequent formation into splint strips, and means to bend alternate splints of the splint strips to opposite sides and transfer the strips to the conveyor while maintaining the bent position of the splints.

2. A machine for making splint strips adapted for use in the manufacture of match strips, which comprise splints connected at one end to a common base strip, having in combination a hopper to receive splint strip blanks to be worked into splint strips, a movable conveyor to receive the finished splint strips, a reciprocating feeder to discharge the blanks from said hopper, means to carry the discharged blanks to successive working positions to subject them to subsequent formation into splint strips, means to bend alternate splints of the splint strips to opposite sides and transfer the strips to the conveyor while maintaining the bent position of the splints, and means on said conveyor to maintain the bent position of the splints.

3. A machine for making splint strips adapted for use in the manufacture of match strips, which comprise splints connected at one end to a common base strip, having in combination a step by step rotatable member, carriers on said member to receive splint strip blanks and move them to successive working positions for their formation into strips, means to discharge the splint strips from the carriers, means to bend alternate splints of the splint strips to opposite sides, and means to further convey the splint strips while maintaining the bent state of the splints.

4. A machine for making splint strips adapted for use in the manufacture of match strips, which comprise splints connected at one end to a common base strip, having in combination carriers to receive splint strip blanks and pass them to successive working positions for their formation into splint strips, means to bend alternate splints of the formed splint strips to opposite sides, means to discharge the splint strips from said carriers, and a conveyor carrying rows of needles to receive the splint strips thus discharged in such a way as to cause the two rows of oppositely bent splints to be on opposite sides of the needles.

5. A machine for making splint strips adapted for use in the manufacture of match strips, which comprise splints connected at one end to a common base strip, having in combination carriers to receive splint strip blanks and pass them to successive working positions for their formation into splint strips, means to supply the splint strip blanks to said carriers, two plates movable towards and away from each other and having their adjacent surfaces provided with coengaging teeth to clamp the formed splint strips, between themselves and bend alternate splints to opposite sides while discharging the strips from said carriers, a conveyor carrying rows of needles to receive the splint strips thus discharged in such a way as to cause the two rows of oppositely bent splints to be on opposite sides of the needles.

6. A machine for making splint strips, having in combination a hopper to receive splint strip blanks to be worked into splint strips, a reciprocating feeder to discharge the blanks from said hopper, an intermittently rotatable supporting member, holders rigidly secured to said member to receive the discharged blanks and yieldingly hold them, means to move the supporting member and holders containing the blanks to successive working positions for formation of the blanks into splint strips, two plates, means to move said plates towards each other to clamp the splint strips therebetween, means to move said plates laterally of said member to remove the splint strips from said holders, and means to move said plates apart to release the splint strips.

JOHAN WERNER JOHANSSON.